Nov. 3, 1970     B. F. HUNGATE     3,537,247
HAY BALER AND HAULING DEVICE
Filed Nov. 4, 1968     2 Sheets-Sheet 2
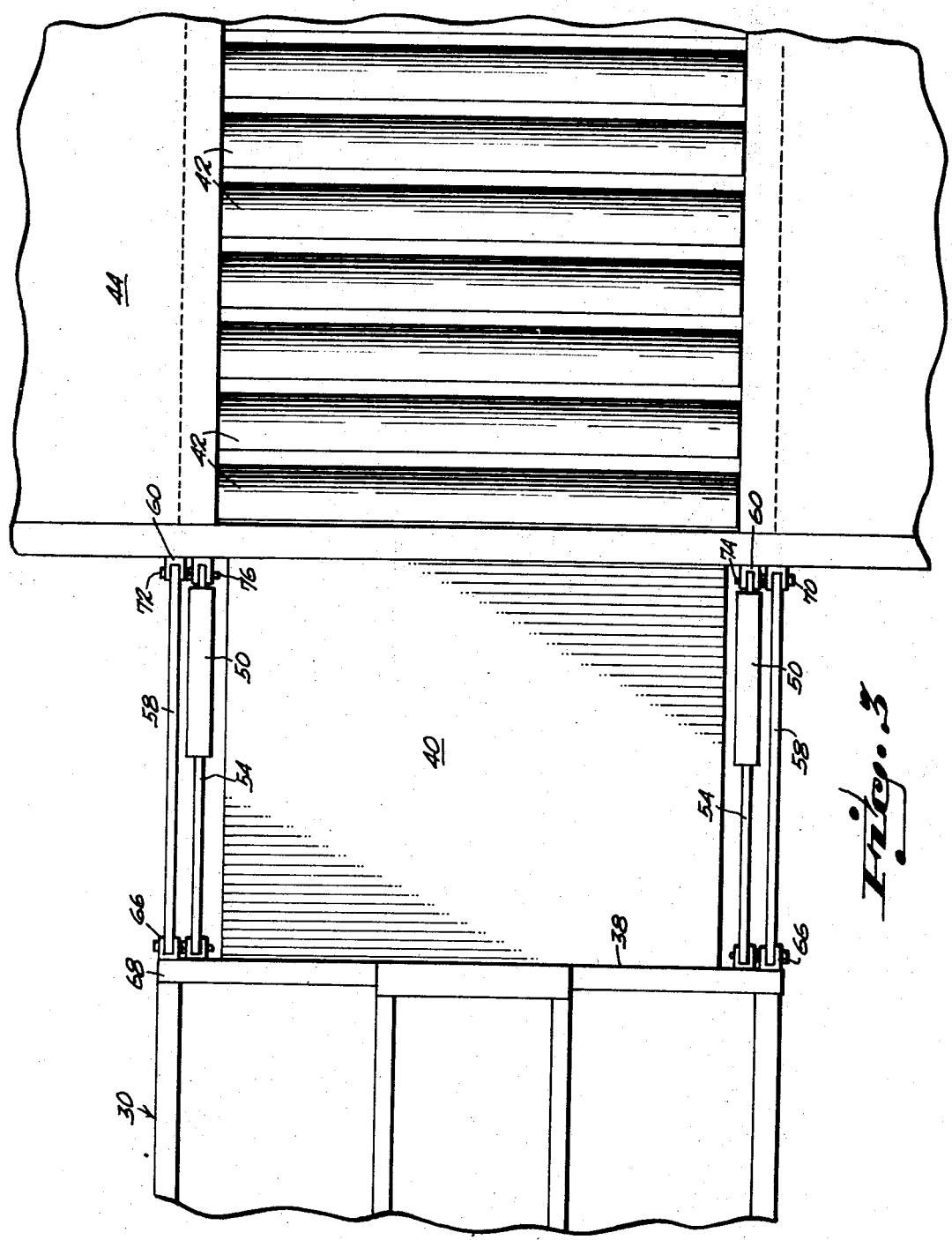
INVENTOR.
BRYAN F. HUNGATE
BY John Cyril Malloy
ATTORNEY.

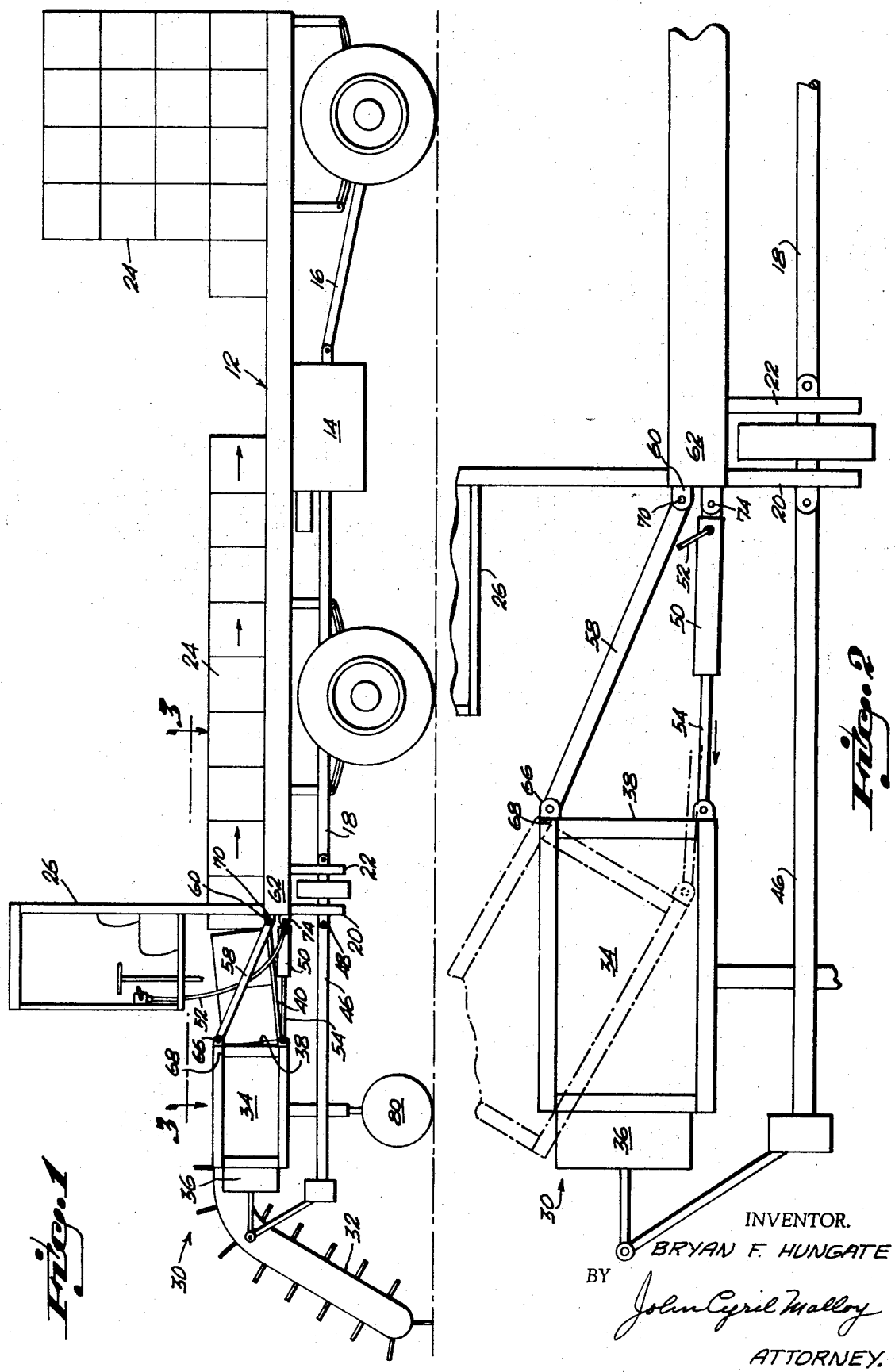

United States Patent Office 3,537,247
Patented Nov. 3, 1970

3,537,247
HAY BALER AND HAULING DEVICE
Bryan F. Hungate, Miami, Fla.
(Rte. 1, Tebbetts, Mo. 65080)
Filed Nov. 4, 1968, Ser. No. 773,231
Int. Cl. A01d 75/04, 90/00
U.S. Cl. 56—473.5                    6 Claims

ABSTRACT OF THE DISCLOSURE

The combination of a hay baler and a vehicle of lading with means to detachably connect the vehicle directly to the hay baler so that the vehicle may be separated from the hay baler and the hay baler left in the field while the vehicle delivers baled hay, the vehicle having a separate power plant.

---

In the past, as is well known, baling of hay in the fields has required certain distinct operations, namely, cutting or mowing the hay, gathering the hay into windrows by raking it, picking up the hay from the windrows by a baler, after the hay has cured, bundling or wrapping discrete equal packages of hay by the baler, and depositing the bundles on the ground, collecting the bales in a separate operation, usually by having men load the bales onto a slowly moving wagon by hand and, then, transporting the loaded wagon to a main storage and collection area and unloading it. This process has required, in the past, one man to mow, one man to rake at a later time, one man to bale at a later time, four men to pick up and transport the bales to the main storage area.

This invention has as an object the provision of improved mechanism for achieving the same operation with a reduced number of men. As in the past, the mowing and raking operations which provide the hay in the windrows remains the same. However, the bailing operation, composed of the pickup and packaging portion of the operation, and the pickup and transporting of the packaged bundles to the main storage area are accomplished in a single machine which employs but two men.

More specifically, in the past, it has been the practice to employ a wagon which is towed by a tractor for picking up and collecting the baled bundles. Also, it has been the practice to use a tractor towing a baler mechanism which picks up and packages the bales of hay. In the present invention, the baler is carried by a self-propelled wagon in an out-of-the-way position so that it does not interfere with the loading capacity of it. It is detachably carried by the wagon at the front where it can be observed at all times in baling operation by the driver of the vehicle, as is explained more fully hereinafter, and whereby the baler may be detached to remain in the field adjacent the windows while the loaded wagon is driven to the main storage area for unloading. In the meantime, a similar self-propelled wagon may be employed so that the baling operation continues.

In this fashion, it has been found that the number of men and hours required for the baling operation and storage is reduced markedly.

In the past, it will be noted from the foregoing description, that the power drive from the power source to the baling mechanism has been from the tractor rearwardly to the towed baler, whereas in the present invention the power transmission proceeds forwardly from the power plant of the self-propelled wagon to the front carried baler mechanism.

The claims are, accordingly, directed both to the structure of the baler and hauler combination and also to the process for packaging and transporting baled hay to a main storage area.

It will be apparent that by reason of the population shifts from the rural areas to the urban areas, and the consequent diminishing of the available labor supply, has resulted in an acute need for an improved baler as described herein.

It will be apparent that the baler mechanism may be detached and stored in a convenient place when not in use in the baling operation and that during these times the self-propelled wagon may be utilized as a utility wagon on a farm. For instance, grain sides may be provided for the wagon so that it can be employed to haul grain or other materials.

It is, accordingly, an object of this invention to provide an improved combination of a baler and self-propelled vehicle for use in collecting and gathering hay from a field and transporting the same to a storage station.

It is another object of this invention to provide an improved process for baling hay and transporting the same to a storage unit.

In accordance with these and other objects which will become apparent hereinafter, the instant invention will now be described with reference to the accompanying drawings in which:

FIG. 1 is a side elevation view of the combination hay baler and self-propelled vehicle in accordance with this invention.

FIG. 2 is a fragmentary enlarged view of a portion of FIG. 1; and

FIG. 3 is a plan view of the central portion of FIG. 1 as indicated by the arrowed line 3—3 of FIG. 1 and looking in the direction of the arrows.

Referring to the drawings, wherein like reference characters designate like or corresponding parts throughout the various views, and referreng particularly to FIG. 1, the numeral 12 generally designates a vehicle having a power plant 14 and a rearward drive shaft 16 to provide the prime power for driving the vhicle as well as a forward power takeoff shaft 18 which is journalled as at 20 and 22. The vehicle is adapted to carry a plurality of bales, such as that designated by the numeral 24, of hay or the like. A driver's cab 26 is also provided for the vehicle with suitable mechanism for operating the vehicle. To the front of the vehicle a hay baler 30 of the conventional type is provided which includes a pickup conveyor 32 which is adapted to transport the hay to the charging chamber 34 of the baler and deposit it with one of the walls of the chamber comprising a ram 36 which is adapted to be moved rearwardly toward the opposite wall 38 which comprises an opening to discharge packed hay and push it across a bridge portion 40 onto a conveyor composed of idler rollers 42 centrally arranged in the bed 44 of the vehicle to transport the bales to the rear to facilitate loading. The baler includes a drive shaft 46 which is adapted to be detachably connected as at 48 to the leading end of the drive shaft or power takeoff shaft 18 for operating the ram. As is indicated in the drawings by the dotted lines in FIG. 2, the hay baler may be pivoted in and out of a position for operation, by using hydraulic pressure transmitted to the piston 50 through the line 52 to extend the piston arm 54 to elevate the baler as an entire unit swinging it upwardly and pivoting it about the distal end of a link 58 pivotally connected at one end in a clevis connection 60 to the forward end 62 of the vehicle and at the other end in a clevis connection 66 to the rear of the baler frame 68. The baler may be removed from the vehicle when the vehicle has been loaded by removing the pins 70 and 72 and 74 and 76 and disconnecting the hydraulic line connection to the piston cylinder with the baler remaining supported in position in the field on the guide gauge or roller 80, and the vehicle may then be driven to a collection station for unloading.

The operation will now be described. After the hay baler has been attached to the vehicle by pivotally connecting the piston 50 and the link member 58 to the clevis connections at the forward end 62 of the vehicle by means of the pins, the height is adjusted by means of raising and lowering the roller gauge 80 so that the conveyor 32 is in the proper relation with respect to the ground. The drive shaft of the hay baler is connected to the drive shaft 18 from the power plant 14 to cyclically operate the ram 36. The hay is picked up and continuously transported by the fingers shown in the drawings to the chamber 34 and, cyclically, the ram 36 moves it toward the opposite wall 38 with the opening. After the first bundle of hay has been moved to the rear, it will form a movable wall of the chamber 38, which, after another batch of hay has been deposited in the chamber, will yield to the movement of the ram 36 to pack another bundle of hay which will not be too tight because the first made bundle will yield and move rearwardly in the direction of the arrows indicated. This process is repeated with the bundles moving across the bridge portion 40 and along the idler rollers 42 to the rear portion of the bed of the truck where they are stacked. It will be apparent that in the conventional manner the hay baler includes a wrapping operation. After the vehicle bed has been loaded, the drive shaft of the baler is disconnected at 48 and the pins are removed from the link member and the piston, whereupon the vehicle may be driven to a main storage area with the hay baler remaining in the field. The link member 58 may be of the telescopic type which extends to the ground and provides an additional support to stabilize the hay baler while it remains unused. When the same vehicle returns, or a similarly equipped vehicle is moved into position adjacent the hay baler and connected to it in the manner described above, the operation of bundling the hay resumes.

What is claimed is:

1. For use in baling hay, in combination:
   (A) a vehicle including
      (a) a bed to support bales of hay,
      (b) a power plant,
      (c) a cab at the front of said vehicle,
      (d) a drive shaft, and
      (e) means to control said power plant and to drive the vehicle located in said cab;
      (f) said vehicle also including a power takeoff at the front thereof adjacent said cab; and
   (B) a hay baler including
      (a) a shaft to be driven by said drive shaft,
      (b) first means to connect said shaft to be driven to said power takeoff and
      (c) second means to connect the hay baler to the front of said vehicle.

2. The improvement as set forth in claim 1 wherein said hay baler includes support means to support the hay baler in an attitude for use and said second means to connect are pivotally adjustable.

3. The improvement as set forth in claim 2 wherein said second means to connect comprises a pair of elongate link members and means at one end of each of said link members to pivotally connect to said hay baler and means to connect at the other end of each of said link members to said vehicle.

4. The improvement as set forth in claim 3 wherein said second means to connect includes a pair of companion piston and cylinder members, each of said pair being adapted for pivotal connection intermediate said hay baler and said vehicle and effective on movement of the piston in said cylinder to pivotally move said hay baler about the pivotal connection of the link member and the hay baler.

5. The improvement as set forth in claim 1 wherein said vehicle includes a conveyor extending longitudinally from the front of said vehicle bed to the rear of said vehicle bed.

6. The improvement as set forth in claim 5 wherein said conveyor includes a plurality of parallel, side-by-side idler rollers and at the bridge portion at the forward end of said vehicle with said bridge portion having a proximal end at the terminal end of said conveyor and a distal portion at the discharge portion of said hay baler.

References Cited

UNITED STATES PATENTS

| | | | |
|---|---|---|---|
| 2,316,435 | 4/1943 | James | 56—474 |
| 2,848,127 | 8/1958 | Grey | 56—473.5 XR |
| 3,159,287 | 12/1964 | Stroup | 56—473.5 XR |
| 3,450,033 | 6/1969 | Bornzin | 100—100 |

RUSSELL R. KINSEY, Primary Examiner

U.S. Cl. X.R.

56—341; 100—100; 214—6